United States Patent [19]
Ho et al.

[11] Patent Number: 5,756,643
[45] Date of Patent: May 26, 1998

[54] POLYMIDE COPOLYMERS CONTAINING POLYCARBONATE SOFT SEGMENTS

[75] Inventors: W. S. Winston Ho; Guido Sartori. both of Annandale; Warren A. Thaler. Flemington; David C. Dalrymple. Bloomsbury, all of N.J.

[73] Assignee: Exxon Research and Engineering Company. Florham Park. N.J.

[21] Appl. No.: 646,212

[22] Filed: May 7, 1996

[51] Int. Cl.[6] ............................................. C08G 63/02
[52] U.S. Cl. ............................ 528/272; 585/819; 128/637
[58] Field of Search ........................ 585/819, 820; 208/308; 210/649, 650, 651; 528/272, 274; 128/637

[56] References Cited

U.S. PATENT DOCUMENTS

| 5,139,023 | 8/1992 | Stanley | 128/637 |
| 5,180,496 | 1/1993 | Sartori | 210/654 |
| 5,396,019 | 3/1995 | Sartori et al. | 585/819 |

*Primary Examiner*—Terressa Mosley
*Attorney, Agent, or Firm*—Ronald D. Hantman

[57] ABSTRACT

A new copolymer composition comprises the hard segment of a polyimide and the soft segment of an oligomeric aliphatic polycarbonate or a mixture of an oligomeric aliphatic polycarbonate and an oligomeric aliphatic polyester. The new polyimide copolymer membranes have exhibited high selectivity and flux for separation of an aromatic/saturate mixture.

18 Claims, No Drawings

POLYIMIDE COPOLYMERS CONTAINING POLYCARBONATE SOFT SEGMENTS

FIELD OF THE INVENTION

The invention is related to new polyimide copolymers containing polycarbonate soft segments, the preparation of membranes from the copolymers, and the use of the membranes in the separation of aromatics from non-aromatics.

BACKGROUND OF THE INVENTION

The use of membranes to separate aromatics from saturates has long been pursued by the scientific and industrial community and is the subject of numerous patents.

U.S. Pat. No. 3,370,102 describes a general process for separating a feed into a permeate stream and a retentate stream and utilizes a sweep liquid to remove the permeate from the face of the membrane to thereby maintain the concentration gradient drive force. The process can be used to separate a wide variety of mixtures including various petroleum fractions, naphthas, oils, hydrocarbon mixtures. Expressly recited is the separation of aromatics from kerosene.

U.S. Pat. No. 2,958,656 teaches the separation of hydrocarbons by type, i.e., aromatic, unsaturated, and saturated, by permeating a portion of the mixture through a non-porous cellulose ether membrane and removing permeate from the permeate side of the membrane using a sweep gas or liquid. Feeds include hydrocarbon mixtures, e.g., naphtha (including virgin naphtha, naphtha from thermal or catalytic cracking, etc.).

U.S. Pat. No. 2,930,754 teaches a method for separating hydrocarbons, e.g., aromatic and/or olefinic, from gasoline-boiling range mixtures by the selective permeation of the aromatic through certain non-porous cellulose ester membranes. The permeated hydrocarbons are continuously removed from the permeate zone using a sweep gas or liquid.

U.S. Pat. No. 4,115,465 teaches the use of polyurethane membranes to selectively separate aromatics from saturates via pervaporation. U.S. Pat. Nos. 5,028,685 and 5,093,003 disclose halogenated polyurethanes and membranes therefrom for separating aromatics from saturates.

U.S. Pat. Nos. 4,944,880, 4,990,275, and 5,241,039 describe polyimide/aliphatic polyester copolymers and membranes therefrom for the separation of aromatics from saturates. U.S. Pat. Nos. 4,946,594 and 4,997,906 describe crosslinked copolymers of aliphatic polyester diols and dianhydrides and membranes therefrom for the separation of aromatics from saturates.

U.S. Pat. No. 4,976,868 discloses the use of polyester membranes (e.g., polyethylene terephthalate, polybutylene terephthalate, and polyethylene terephthalate/cyclohexanedimethanol terephthalate) for aromatics/saturates separation. U.S. Pat. Nos. 5,012,036, 5,012,035 and 5,019,666 teach the use of polyarylate, polyphthalatecarbonate, and non-porous polycarbonate membranes, respectively, to separate aromatics from saturates. U.S. Pat. No. 5,055,631 discloses sulfonated polysulfone membranes for the separation of aromatics from saturates.

U.S. Pat. Nos. 5,128,439 and 5,177,296 describe saturated polyesters and crosslinked membranes therefrom for aromatics/saturates separation. U.S. Pat. Nos. 5,139,023 and 5,180,496 describe unsaturated polyesters and crosslinked membranes therefrom for aromatics/saturates separation. In addition, U.S. Pat. No. 5,396,019 includes the use of crosslinked fluorinated polyolefin membranes for the separation of aromatics from saturates, wherein aromatics can contain sulfur and nitrogen.

The present invention describes new polyimide copolymers containing polycarbonate soft segments, prepared from an aliphatic polycarbonate diol, or a mixture of an aliphatic polycarbonate diol and an aliphatic polyester diol, a dianhydride, and a diamine.

In addition, the invention describes the preparation of membranes from the above copolymers and their use in the separation of aromatics from non-aromatics.

SUMMARY OF THE INVENTION

The present invention describes new polyimide copolymers containing polycarbonate soft segments and their synthesis from an aliphatic polycarbonate diol or a mixture of an aliphatic polycarbonate diol and an aliphatic polyester diol, a dianhydride, and a diamine. The invention also includes the preparation of membranes including the above copolymers and their use for aromatics/saturates separation.

DESCRIPTION OF THE PREFERRED EMBODIMENT

New polyimide copolymers containing polycarbonate soft segments have been synthesized from an oligomeric aliphatic polycarbonate diol or a mixture of an oligomeric aliphatic polycarbonate diol and an oligomeric aliphatic polyester diol, a dianhydride, and a diamine. To illustrate the synthesis and composition of the new copolymers, a polyimide-polycarbonate copolymer membrane is used as an example. In the synthesis, one mole of polyhexamethylenecarbonate (PHC) diol is reacted with two moles of pyromellitic dianhydride (PMDA) to make a prepolymer in the end-capping step. The prepolymer is dissolved in a suitable solvent such as dimethyl formamide (DMF). In the DMF solution, one mole of the prepolymer reacts with one mole of methylene di-o-chloroaniline (MOCA) to make a copolymer containing polyamic acid hard segment and PHC soft segment in the chain-extension step. The new copolymer membrane can be prepared by casting (film coating) the solution onto a glass plate or a porous support (e.g., porous Gore-tex teflon), adjusting the thickness by means of a casting knife, drying the membrane first at a suitable temperature (e.g., room temperature) to remove most of the solvent (solvent evaporation), and heating at a suitable temperature (e.g., 90° C.) to practically completely remove all of the solvent. Finally, curing of the membrane at an elevated temperature, e.g., 220° C. or 300° C., for a suitable amount of time, e.g., 8 hours or 30 minutes, results in the polyimide-polycarbonate copolymer membrane. The curing step converts the polyamic acid hard segment to the polyimide hard segment via the imide ring closure with the release of water.

A mixture of a polyhexamethylenecarbonate diol and a polyethyleneadipate diol can be used instead of a polyhexamnethylenecarbonate diol. A polyethylenecarbonate diol, a polytetramethylenecarbonate diol, a polypentamethylenecarbonate diol, a polyheptamethylenecarbonate diol or a polyoctamethylenecarbonate diol can be used instead of a polyhexamethylenecarbonate diol. A polysuccinate diol, a polymalonate diol, a polyoxalate diol or a polyglutarate diol can be used instead of a polyadipate diol. The dianhydride is preferred to be an aromatic compound. Non-limiting examples include pyromellitic dianhydride, 3,3',4,4'-benzophenone tetracarboxylic dianhydride, 4,4'-(hexafluoroisopropylidene)-bis(phthalic anhydride), 4,4'- oxydiphthalic anhydride, diphenylsulfone-3,3',4,4'-tetracarboxylic dianhydride. Non-limiting examples of diamines include phenylene diamine, methylene dianiline (MDA), methylene di-o-chloroaniline (MOCA), methylene bis(dichloroaniline), methylene dicyclohexylamine, methylene dichlorocyclohexylamine, methylene bis (dichlorocyclohexylamine), 4,4'-(hexafluoroisopropylidene)-bisaniline (6F diamine), 3,3'-diaminophenyl sulfone, 4,4'-diaminophenyl sulfone, 4,4'-dimethyl-3,3'-diaminophenyl sulfone, 2,4-diamino cumene, methylene bis(di-o-toluidine), oxydianiline, bisaniline A, bisaniline M, bisaniline P, thiodianiline, 2,2-bis|4-(4-aminophenoxy)phenyl] propane, |4-bis(4-aminophenoxy phenyl) sulfone, 4,4'-bis(4-aminophenoxy) biphenyl, 1,4'-bis(4-aminophenoxy) benzene, and 1,3-bis(4-aminophenoxy) benzene.

The copolymers of the invention can be used for the preparation of membranes. The membranes are useful for the separation of aromatics, including sulfur and nitrogen heteroatom cyclic compounds, from saturates in petroleum and chemical streams, and have been found to be particularly useful for the separation of large substituted aromatics from saturates as are encountered in heavy catalytic naphtha streams boiling at 140° C.–235° C. Other streams which are also suitable feed streams for aromatics/saturates separation are intermediate catalytic naphtha streams boiling at 93° C.–160° C., light aromatics content streams boiling in the 40° C.–150° C. range, light catalytic cycle oil boiling in the 200° C.–345° C. range, jet fuel boiling in the 140° C.–280° C. range, diesel boiling in the 200° C.–365° C. range as well as streams in chemical plants which contain recoverable quantities of benzene, toluene, xylenes (BTX) or other aromatics in combination with saturates. Combinations of above streams are also suitable feed streams. Examples of sulfur-containing aromatics are thiophene, benzothiophene, dibenzothiophene and their alkyl derivatives. Examples of nitrogen-containing aromatics are aniline, pyridine, quinolines, acridine, 7,8-benzoquinoline and their alkyl derivatives. The separation techniques which may successfully employ the membranes of the present invention include perstraction and pervaporation.

Perstraction involves the selective dissolution of particular components contained in a mixture into the membrane, the diffusion of those components through the membrane, and the removal of the diffused components from the downstream side of the membrane by the use of a liquid sweep stream. In the perstractive separation of aromatics from saturates in petroleum or chemical streams, the aromatic molecules present in the feed stream dissolve into the membrane film more easily than the saturates, due to similarities between the membrane solubility parameter and those of the aromatic species in the feed. The aromatics then permeate (diffuse) through the membrane and are swept away by a sweep liquid which is low in aromatics content. This keeps the concentration of aromatics at the permeate side of the membrane film low and maintains the concentration gradient which is responsible for the permeation of the aromatics through the membrane.

The sweep liquid is low in aromatics content so as not to itself decrease the concentration gradient. The sweep liquid is preferably a saturated hydrocarbon liquid with a boiling point much lower or much higher than that of the permeate aromatics. This is to facilitate separation, as by simple distillation. Suitable sweep liquids, therefore, would include, for example $C_3$ to $C_6$ saturated hydrocarbons and lube base stocks ($C_{15}$–$C_{20}$).

The perstraction process is run at any convenient temperature preferably as low as possible.

The choice of pressure is not critical since the perstraction process is not dependent on pressure, but on the ability of the aromatic components in the feed to dissolve into and migrate through the membrane under a concentration driving force. Consequently, any convenient pressure may be employed, the lower the better to avoid undesirable compaction, if the membrane is supported on a porous backing, or rupture of the membrane, if it is not. If $C_3$ or $C_4$ sweep liquids are used at 25° C. or above in liquid state, the pressure must be increased to keep them in the liquid phase.

Pervaporation, by comparison, is run at generally higher temperatures than perstraction and relies on vacuum on the permeate side to evaporate the permeate from the surface of the membrane and maintain the concentration gradient driving force which drives the separation process. As in perstraction, the aromatic molecules present in the feed dissolve into the membrane film, migrate through said film and emerge on the permeate side under the influence of concentration gradient. Pervaporation separation of aromatics from saturates can be performed at a temperature of about 25° C. for the separation of benzene from hexane but for separation of heavier aromatics/saturate mixtures, such as heavy catalytic naphtha, higher temperatures of at least 80° C. and higher, preferably at least 100° C. and higher, more preferably at least 120° C. have been successfully used with membranes prepared from the copolymers of this invention, the maximum upper limit being that temperature at which the membrane is physically damaged. Vacuum on the order of 1–80 mm Hg is pulled on the permeat side. The vacuum stream containing the permeate is cooled to condense out the highly aromatic permeate. Condensation temperature should be below the dew point of the permeate at a given vacuum level. Instead of vacuum, a sweep gas may also be used in the permeate side.

The membrane itself may be in any convenient form utilizing any convenient module design. Thus, sheets of membrane material may be used in spiral-wound or plate-and-frame permeation cells modules. Tubes and hollow fibers of membranes may be used in bundled configuration with either the feed or the sweep liquid (or vacuum) in the internal space of the tube or fiber, the other material obviously being on the other side.

When the membrane is used in a hollow fiber configuration with the feed introduced on the exterior side of the fiber, the sweep liquid flows on the inside of the hollow fiber to sweep away the permeated highly aromatic species, thereby maintaining the desired concentration gradient. The sweep liquid, along with the aromatics contained therein, is passed to separation means, typically distillation means, however, if a sweep liquid of low enough molecular weight is used, such as liquefied propane or butane, the sweep liquid can be permitted to simply evaporate, the liquid aromatics being recovered and the gaseous propane or butane (for example) being recovered and reliquefied by application of pressure or lowering of temperature.

We have evaluated the membranes to separate a mixture containing toluene and isooctane in a pervaporation apparatus. The initial mixture contains about equal weights of the two hydrocarbons. The pervaporation apparatus is a cell separated into two compartments by a porous metal plate, on which the membrane is supported. During a pervaporation experiment, the toluene-isooctane mixture is circulated through the upper compartment at the desired temperature. The lower compartment is kept at reduced pressure. The permeate is collected in a trap cooled with dry ice-acetone or isopropanol and periodically analyzed by gas chromatography.

The invention is illustrated further by the following examples, which, however, are not to be taken as limiting in any respect. All parts and percentages, unless expressly stated to be otherwise, are by weight.

EXAMPLE 1

Synthesis of Polyimide-Polycarbonate Copolymer Membrane

To 2.18 g (0.01 mole) of pulverized pyromellitic dianhydride (PMDA) in a 100 ml, 4-neck reactor equipped with an air-driven stainless stirrer, a thermometer and thermo-watch and purged with nitrogen was added 10 g (0.005 mole) of polyhexamethylenecarbonate diol with a molecular weight of 2000 (PHC 2000). The reactor was then heated and stirred at 100° C. for 2 hours before 5 g of dimethyl formamide (DMF) was added. At this temperature, the reactants were stirred for additional 3 hours to complete the end-capping step. To the reactor content was added 5 g of DMF, and the temperature was allowed to drop to about 70° C. To this reactor content was added 1.34 g (0.005 mole) of methylene di-o-chloroaniline (MOCA) in 4 g DMF solution dropwise. The reactor solution was stirred at 80° C. for 2.5 hours during which additional 8.8 g DMF was added gradually to the reactor content to keep up with the viscosity increase of the solution, which indicated the chain-extension reaction. Then, the solution containing the copolymer with the polyamic acid hard segment and the polycarbonate soft segment was allowed to reach room temperature.

The resulting solution was centrifuged for about 5 minutes to remove (air) bubbles. Following centrifugation, a membrane was knife-cast onto a glass plate by the use of a knife gap setting of 15 mils. DMF was allowed to evaporate from the membrane in a box purged with nitrogen in a hood at room temperature for about 17 hours. The membrane was then dried in an oven at 90° C. for 2 hours. The membrane was removed from the glass plate by soaking it in a water bath for 1 hour. Then, the membrane was dried at about 80° C. for 64 hours. Finally, the membrane was cured, by heating it from room temperature to 220° C, maintaining it at this temperature for 8 hours and then cooling it to room temperature in the curing step, to obtain the polyimide-polycarbonate membrane. The resulting membrane had 89 microns in thickness.

EXAMPLE 2

Pervaporation Results for Polyimide-Polycarbonate Copolymer Membrane

The resulting membrane described in Example 1 was evaluated for aromatic/saturate separation with a feed mixture of 50 wt. % toluene and 50 wt. % isooctane at 100°, 120°, 150°, 170°, and 190° C. in the pervaporation apparatus described above with the permeate side kept under vacuum. Analyses of the permeates were carried out by gas chromatography. Table 1 gives the separation results. In this table, the separation factor is defined as the ratio of toluene and isooctane concentrations in the permeate divided by the ratio of toluene and isooctane concentrations in the feed. The normalized flux, i.e., permeability, is expressed in the unit of kilogram of permeate per meter square membrane area per day for a normalized membrane thickness of 1 micron ($Kg \cdot \mu M/M^2/D$).

TABLE 1

Pervaporation Results for Polyimide-Polycarbonate Copolymer Membrane

| Temperature (°C.) | Toluene/Isooctane Separation Factor | Normalized Flux (Permeability) ($Kg \cdot \mu M/M^2/D$) |
|---|---|---|
| 100 | 9.1 | 2460 |
| 120 | 7.6 | 4050 |
| 150 | 7.1 | 6790 |
| 170 | 6.3 | 10740 |
| 190 | 5.9 | 13080 |

EXAMPLE 3

Synthesis of Polyimide Copolymer Membrane with the Soft Segment Containing 70 wt. % Polycarbonate and 30 wt. % Polyadipate To 2.18 g (0.01 mole) of pulverized pyromellitic dianhydride (PMDA) heated (about 100° C.) under $N_2$ in a reactor were added 7 g (0.0035 mole) of polyhexamethylenecarbonate diol with a molecular weight of 2000 (PHC 2000) and 3 g (0.0015 mole) of polyethyleneadipate diol with a molecular weight of 2000 (PEA 2000) with stirring. The temperature was about 100° C., and the stirring continued for about 5 hours to complete the end-capping step. To the reactor content was added 25 g of DMF, and the temperature was dropped to about 80° C. with stirring for about 0.5 hour. To this reactor content was added 1.34 g (0.005 mole) of MOCA in 4 g DMF solution dropwise. The solution was stirred at 80° C. for 2.5 hours. Then, a viscous solution resulted, which indicated the chain-extension reaction. Additional DMF, about 3 g, was added, and the solution was then cooled to room temperature. The resulting solution containing the copolymer with the polyamic acid hard segment and the soft segment of polyhexamethylenecarbonate and polyethyleneadipate had suitable consistency for solution casting in the preparation of membranes.

The resulting solution was centrifuged for about 5 minutes. Following centrifugation, a membrane was knife-cast onto a glass plate with a knife gap setting of 14 mils. DMF was allowed to evaporate from the membrane in a nitrogen box in a hood at ambient conditions over a period of about 17 hours. The membrane was then dried in an oven at 90° C. for 2 hours. The membrane was removed from the glass plate by soaking it in a water bath. Then, the membrane was dried at 120° C. overnight. Finally, the membrane was heated to 300° C., maintained at this temperature for 0.5 hour and then cooled to room temperature. The resulting copolymer membrane had the hard segment of polyimide and the soft segment of polyhexamethylenecarbonate and polyethyleneadipate, and it had a thickness of about 53 microns.

EXAMPLE 4

Pervaporation Results for Polyimide Copolymer Membrane with the Soft Segment Containing 70 wt. % Polycarbonate and 30 wt. % Polyadipate The resulting membrane described in Example 3 was evaluated for aromatic/saturate separation with the feed mixture of 50 wt. % toluene and 50 wt. % isooctane in the same way described in Example 2. Table 2 shows the separation results.

TABLE 2

Pervaporation Results for Polyimide Copolymer Membrane with the Soft Segment Containing 70 wt. % Polycarbonate and 30 wt. % Polyadipate

| Temperature (°C.) | Toluene/Isooctane Separation Factor | Normalized Flux (Permeability) (Kg · μM/M$^2$/D) |
|---|---|---|
| 100 | 19.5 | 490 |
| 120 | 13.3 | 1090 |
| 150 | 11.2 | 2070 |
| 170 | 12.0 | 2710 |
| 190 | 12.6 | 3470 |

What is claimed is:

1. A copolymer composition of matter comprising the hard segment of a polyimide and the soft segment of an oligomeric aliphatic polycarbonate or a mixture of an oligomeric aliphatic polycarbonate and an oligomeric aliphatic polyester, wherein said polyimide is derived from a dianhydride having between 8 and 20 carbons and a diamine having between 2 and 30 carbons, said oligomeric aliphatic polycarbonate is selected from the group consisting of a polyhexamethylenecarbonate, a polyethylenecarbonate, a polytetramethylenecarbonate, a polypentamethylenecarbonate, a polyheptamethylenecarbonate and a polyoctametylenecarbonate, and said oligomeric aliphatic polyester is selected from the group consisting of a polyadipate, a polysuccinate, a polymalonate, a polyoxalate and a polyglutarate.

2. The composition of claim 1 wherein said dianhydride is an aromatic compound.

3. The composition of claim 1 wherein said diamine is selected from the group consisting of phenylene diamine, methylene dianiline (MDA), methylene di-o-chloroaniline (MOCA), methylene bis(dichloroaniline), methylene dicyclohexylamine, methylene dichlorocyclohexylamine, methylene bis(dichlorocyclohexylamine), 4,4'-(hexafluoroisopropylidene)-bisaniline, 3,3'-diaminophenyl sulfone, 4,4'-diaminophenyl sulfone, 4,4'-dimethyl-3,3'-diaminophenyl sulfone, 2,4'diamino cumene, methylene bis(di-o-toluidine), oxydianiline, bisaniline A, bisaniline M, bisaniline P, thiodianiline, 2,2-bis[4-(4-aminophenoxy)phenyl] propane, bis[4-(4aminophenoxy) phenyl] sulfone, 4,4'-bis-(4-aminophenoxy) biphenyl, 1,4-bis(4-aminophenoxy) benzene, and 1,3-bis(4-aminophenoxy) benzene.

4. The composition of claim 2 wherein said aromatic compound is selected from the group consisting of pyromellitic dianhydride, 3,3',4,4'-benzophenone tetracarboxylic dianhydride, 4,4'-(hexafluoroisopropylidene)bis(phthalic anhydride), 4,4'-oxydiphthalic anhydride, diphenylsulfone-3,3',4,4'-tetracarboxylic dianhydride, and 3,3',4,4'-biphenyltetracarboxylic dianhydride.

5. The composition of claim 1 wherein said polycarbonate is polyhexamethylenecarbonate.

6. The composition of claim 1 wherein said polyester is polyethyleneadipate.

7. The composition of claim 1 wherein said polyester is polyethylenesuccinate.

8. The composition of claim 1 wherein said diamine is methylene di-o-chloroaniline.

9. The composition of claim 1 wherein said diamine is methylene dianiline.

10. A process for the separation of aromatics from non-aromatics comprising selectively permeating the aromatics through a membrane including a copolymer including the hard segment of a polyimide and the soft segment of an oligomeric aliphatic polycarbonate or a mixture of an oligomeric aliphatic polycarbonate and an oligomeric aliphatic polyester, wherein said polyimide is derived from a dianhydride having between 8 and 20 carbons and a diamine having between 2 and 30 carbons, said oligomeric aliphatic polycarbonate is a polyhexamethylenecarbonate, a polyethylenecarbonate, a polytetramethylenecarbonate, a polypentamethyenecarbonate, a polyheptamethylenecarbonate or a polyoctamethylenecarbonate, and said oligomeric aliphatic polyester is a polyadipate, a polysuccinate, a polymalonate, a polyoxalate or a polyglutarate.

11. The process of claim 10 wherein said dianhydride of said copolymer includes an aromatic compound.

12. The process of claim 10 wherein said diamine is selected from the group consisting of phenylene diamine, methylene dianiline (MDA), methylene di-o-chloroaniline (MOCA), methylene bis(dichloroaniline), methylene dicyclohexylamine, methylene dichlorocyclohexylamine, methylene bis(dichlorocyclohexylamine), 4,4'-(hexafluoroisopropylidene)-bisaniline, 3,3'-diaminophenylsulfone, 4,4'-diaminophenyl sulfone, 4,4'-dimethyl-3,3'-diaminophenyl sulfone, 3,4-diamino cumene, methylene bis(di-o-toluidine), oxydianiline, bisaniline A, bisaniline M, bisaniline P, thiodianiline, 2,2-bis[4-(4-aminophenoxy) phenyl] propane, bis[4-(aminophenoxy) phenyl] sulfone, 4,4'-bis-(4-aminophenoxy) biphenyl, 1,4-bis(4-aminophenoxy) benzene, and 1,3-bis(4-aminophenoxy) benzene.

13. The process of claim 11 wherein said aromatic compound is selected from the group consisting of pyromellitic dianhydride, 3,3',4,4'-benzophenone tetracarboxylic dianhydride, 4,4'-(hexafluoroisopropylidene)bis(phthalic anhydride), 4,4'-oxydiphthalic anhydride, diphenylsulfone-3,3',4,4'-tetracarboxylic dianhydride, and 3,3',4,4'-biphenyltetracarboxylic dianhydride.

14. The process of claim 10 wherein said polycarbonate is polyhexamethylenecarbonate.

15. The process of claim 10 wherein said polyester is polyethyleneadipate.

16. The process of claim 10 wherein said polyester is polyethylenesuccinate.

17. The process of claim 10 wherein said diamine is methylene di-o-chloroaniline.

18. The process of claim 10 wherein said diamine is methylene dianiline.

* * * * *